(12) United States Patent
Vitsnudel

(10) Patent No.: US 8,913,150 B2
(45) Date of Patent: Dec. 16, 2014

(54) DYNAMIC IMAGE CAPTURE UTILIZING PRIOR CAPTURE SETTINGS AND USER BEHAVIORS

(75) Inventor: Ilia Vitsnudel, Even Yehoda (IL)

(73) Assignee: Broadcom Corporation, Irvine, CA (US)

( * ) Notice: Subject to any disclaimer, the term of this patent is extended or adjusted under 35 U.S.C. 154(b) by 187 days.

(21) Appl. No.: 13/401,017

(22) Filed: Feb. 21, 2012

(65) Prior Publication Data
US 2013/0215289 A1  Aug. 22, 2013

Related U.S. Application Data

(60) Provisional application No. 61/549,495, filed on Oct. 20, 2011.

(51) Int. Cl.
*H04N 5/228* (2006.01)
*H04N 5/235* (2006.01)

(52) U.S. Cl.
USPC .................................. 348/222.1; 348/221.1

(58) Field of Classification Search
CPC . H04N 5/2354; H04N 5/2256; H04N 5/2351; H04N 9/735; H04N 9/045; H04N 5/232; H04N 5/772; H04N 5/335; H04N 5/23293; G03B 15/05

USPC ............................................ 348/222.1, 221.1
See application file for complete search history.

(56) References Cited

U.S. PATENT DOCUMENTS

| | | | |
|---|---|---|---|
| 7,423,674 B2 * | 9/2008 | Takeshita | 348/223.1 |
| 7,974,529 B2 * | 7/2011 | Koguchi et al. | 396/166 |
| 2005/0099529 A1 * | 5/2005 | Hattori | 348/370 |
| 2008/0297589 A1 * | 12/2008 | Kurtz et al. | 348/14.16 |
| 2010/0194963 A1 * | 8/2010 | Terashima | 348/333.11 |

* cited by examiner

*Primary Examiner* — Tuan Ho
*Assistant Examiner* — Selam Gebriel
(74) *Attorney, Agent, or Firm* — Sterne Kessler Goldstein & Fox P.L.L.C.

(57) ABSTRACT

Methods, systems, and computer program products are provided for dynamically capturing images according to prior capture settings and user behaviors. A first image is captured with a plurality of capture settings selected by a user. A user gesture to accept or delete the first image is detected. The parameters describing the preferred capture settings for the user are subsequently determined based on the first image she accepts or deletes. Upon receiving an indication from the user to capture a second image, the settings of the imaging device are adjusted according to the determined parameters and the second image is captured using the preferred parameters.

20 Claims, 5 Drawing Sheets

DYNAMIC IMAGE CAPTURE UTILIZING PRIOR CAPTURE SETTINGS AND USER BEHAVIORS

CROSS REFERENCE TO RELATED APPLICATION

This patent application claims the benefit of U.S. Provisional Patent Application No. 61/549,496, filed Oct. 20, 2011, entitled "Enhanced Video Capture Techniques."

BACKGROUND OF THE INVENTION

1. Field of Invention

The present disclosure relates generally to image capturing techniques.

2. Related Art

Image capturing apparatuses are widely used in many devices ranging from tablet computers, smartphones, personal digital assistants (PDAs), automobiles, astronomical devices to scientific devices. Imaging capturing apparatus, such as digital cameras and videocameras, can display images on a screen immediately after they are taken. Given that the user has to adjust various settings of a camera, the user frequently takes several pictures consecutively of the same target before viewing the pictures on the display screen in a reviewing mode and finding a picture that meets the user's requirement. As a result, the user has to go through a lengthy and tedious manual process to select a picture she desires. Furthermore, because the user has to pull the camera away from the target and switch to the reviewing mode, the opportunity to take the best shot may be lost if the user rejects all the pictures taken.

Some point-and-shoot cameras attempt to address these issues by providing focus free lenses, autofocus, or an automatic system for setting the exposure options. However, such conventional approaches do not take individual user preferences into consideration and accordingly fail to provide an ideal user experience.

BRIEF DESCRIPTION OF THE DRAWINGS/FIGURES

The accompanying drawings, which are incorporated herein and form a part of the specification, illustrate embodiments of the present invention and, together with the description, further serve to explain the principles of the invention and to enable a person skilled in the relevant art to make and use the invention.

Figure 1:
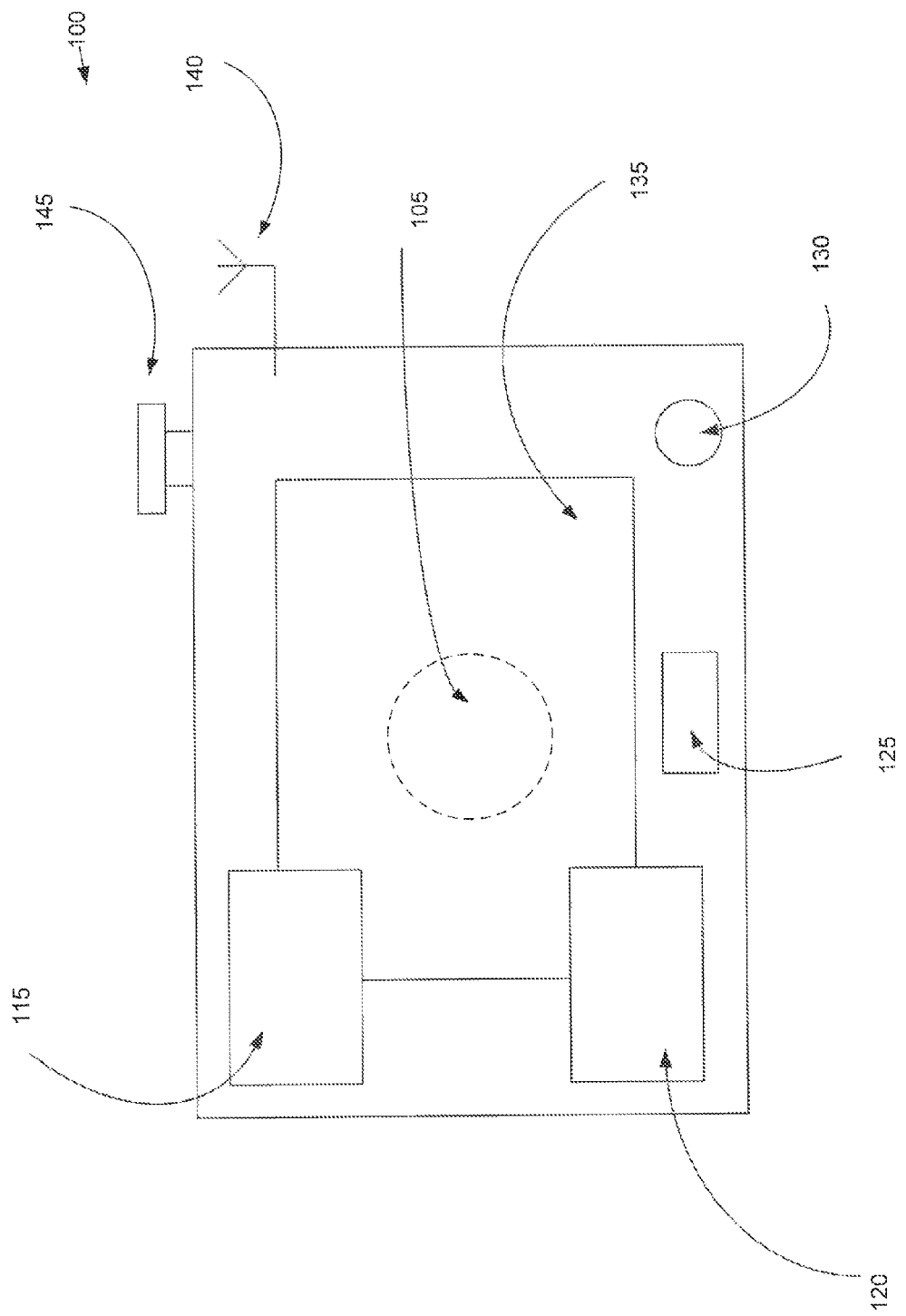
FIG. 1 is a perspective view illustration of an imaging apparatus suitable for practicing an embodiment of the present disclosure.

The invention will be described in detail with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION OF THE INVENTION

I. Introduction

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

It would be apparent to one of skill in the art that the present invention, as described below, can be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, and within the scope and spirit of the present invention.

Reference to modules in this specification and the claims means any combination of hardware, software, or firmware components for performing the indicated function. A module need not be a rigidly defined entity, such that several modules may overlap hardware and software components in functionality. For example, a software module may refer to a single line of code within a procedure, the procedure itself being a separate software module. One skilled in the relevant arts will understand that the functionality of modules may be defined in accordance with a number of stylistic or performance-optimizing techniques, for example.

One skilled in the relevant arts will appreciate that a number of application-specific integrated circuit (ASIC) example implementations are within the scope and spirit of this invention, such as a Blu-Ray disc player, cable set-top box, or home media gateway.

The present disclosure relates to a system having a memory configured to store modules. The modules include a settings capturing module configured to capture a first image on an imaging device, a gesture detecting module configured to detect a user gesture to delete or accept the first image captured on the imaging device, a settings determining module configured to determine user preferred settings of the imaging device based on the first image that the user deletes or accepts, an indication receiving module configured to receive an indication from the user to capture a second image, and a settings adjusting module configured to adjust the settings of the imaging device based on the user preferred settings determined from the first image. The settings capturing module is further configured to capture the second image with the adjusted settings. A processor, coupled to the memory, is configured to process the modules.

According to a further embodiment of the invention, there is provided a method including capturing a first image on an imaging device, detecting a user gesture to delete or accept the first image, determining user preferred settings of the imaging device based on the first image that the user deletes or accepts, receiving an indication from the user to capture a second image, adjusting the settings of the imaging device based on the user preferred settings determined from the first image, and capturing the second image with the adjusted settings.

Additional embodiments of the invention include a computer-readable storage device having instructions stored thereon, execution of which, by a computing device, causes the computing device to perform operations comprising capturing a first image on an imaging device, detecting a user gesture to delete or accept the first image, determining user preferred settings of the imaging device based on the first image that the user deletes or accepts, receiving an indication from the user to capture a second image, adjusting the settings of the imaging device based on the user preferred settings determined from the first image, and capturing the second image with the adjusted settings.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

II. A Dynamic Imaging Capturing System

FIG. 1 is a perspective view illustration of an exemplary imaging apparatus suitable for practicing an embodiment of the present invention. As shown in FIG. 1, the imaging apparatus 100 (e.g. a digital camera) includes a photographic lens 105, a Liquid Crystal Display (LCD) screen 135, and a push button 145.

Photographic lens 105 has functionalities such as image acquisition, focus adjustment and iris settings. LCD screen 135 displays images and provides image feedback information to users. Push button 145 facilitates image acquisition, adjusts preferred mode settings, and also acts as an approval button to accept images satisfactory to the user.

Moreover, imaging apparatus 100 includes an image processor 115, a Central Processing Unit (CPU) 120 and an internal memory 125. Image processor 115 handles tasks such as connecting to a general camera Internet Service Provider (ISP) and calculating statistics on prior user behaviors to determine and predict preferred capture settings. CPU 120 acts as a general software processing unit for the assessment of various image capture settings based on prior user behaviors. Internal memory 125 stores images previously captured, user preferred capture settings, statistics reflecting prior user behaviors, and temporarily filtered user data.

Imaging apparatus 100 further includes focus detection and estimation unit 130 and transmitter/receiver 140. Focus detection and estimation unit 130 contains sensors to determine and adjust the correct focus. Transmitter/receiver 140 receives and transmits images for remote analysis and display, fetches and stores user selected settings and preferences.

It should be noted that the components described above are for illustration purpose only. An imaging apparatus suitable to practice the present invention may contain more or less components than the device described above.

Figure 2:
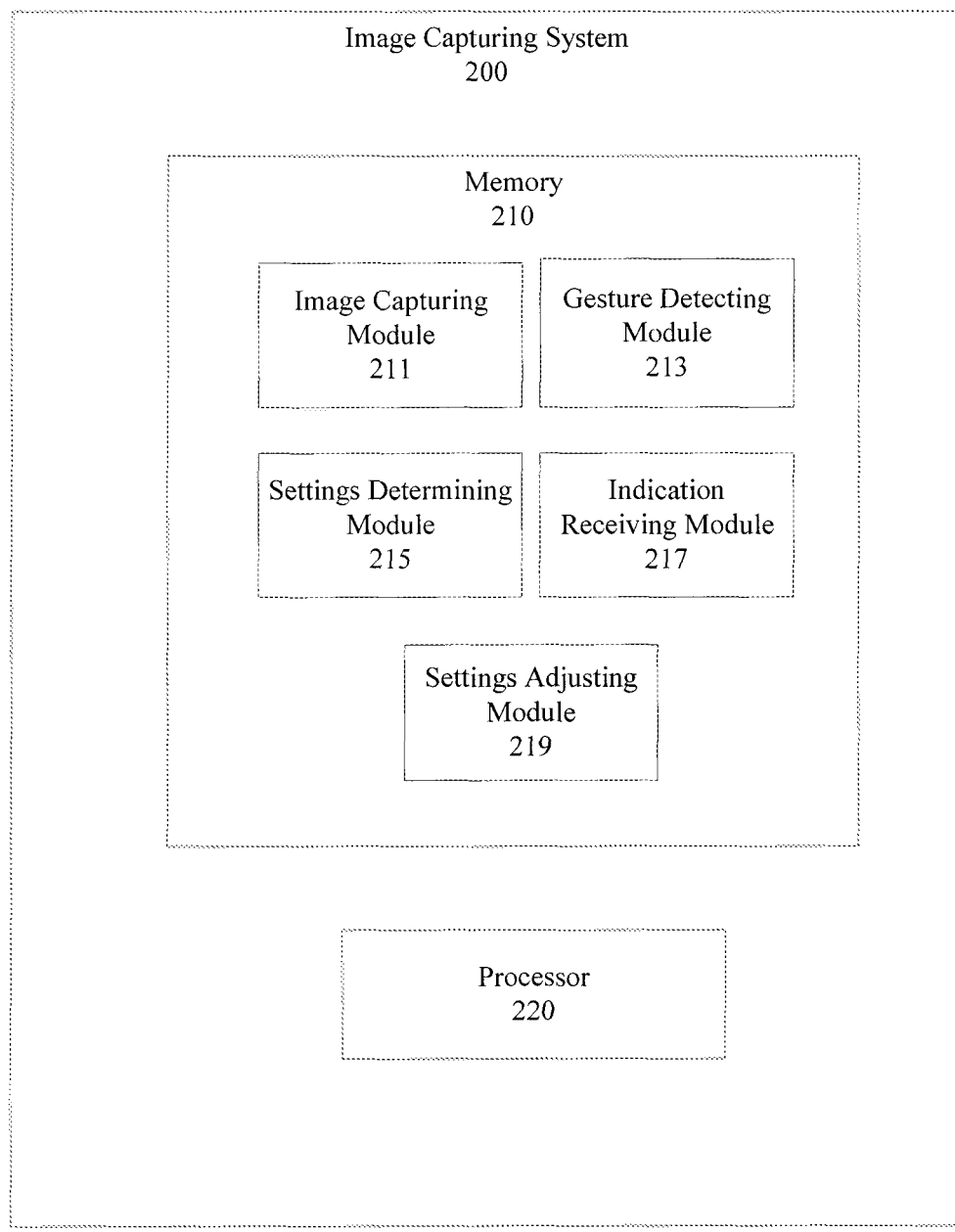
FIG. 2 illustrates elements of an image capturing system, according to an embodiment of the present disclosure.

FIG. 2 illustrates elements of an image capturing system, according to an embodiment of the present invention. In the example shown in FIG. 2, image capturing system 200 includes a memory 210 and processors 220. Memory 210 further includes an image capturing module 211, a gesture detecting module 213, a settings determining module 215, an indication receiving module 217, and a settings adjusting module 219.

Image capturing module 211 captures a set of images on an imaging device such as apparatus 100 illustrated in FIG. 1. The set of images may be a single image or multiple images. A user may use a plurality of settings of the imaging device to capture each image. For example, the user may select an aperture setting of photographic lens 105 to control the amount of light reaching the image sensor. Alternatively, the user may select a shutter speed to regulate the image sensor's degree of exposure to light. In another alternative, the user may select an International Organization for Standardization (ISO) speed to control the sensitivity of the imaging device to light. Accordingly, each image may be captured with various parameters such as sharpness, contrast, colorization, and etc. Likewise, each parameter may correspond to the physical settings of the imaging device.

Gesture detecting module 213 detects a user gesture to delete or accept the images previously captured. A user may set a dial or push button 145 to get to a review mode to display the images on LCD screen 135. By examining the single or multiple images previously captured, especially multiple images taken consecutively of the same target, the user may select one or more pictures that she prefers.

Setting determining module 215 determines the user preferred settings of the imaging device based on the images that the user deletes or accepts. Due to the fact that each image corresponds to a plurality of capture settings of the imaging device, the user's acceptance or rejection of the images indicates the user preferred settings. In one embodiment, in a "sports mode" or "action mode" which captures sporting events, or a moving object, a first user may prefer to stop the action and avoid blur in the photo. Accordingly, she may set a fast shutter speed to stop the action and apply relatively ample light. Another user may prefer blurriness under a sports mode to create certain dramatic effect. Conversely, he may use a slower shutter speed and less light than the first user does. Therefore, through a user's rejection or acceptance of a series of images taken under various capture settings, the embodiment of the present disclosure may infer and predict the user's preferences on the settings of the imaging device.

Indication receiving module 217 receives an indication from the user to capture a new image or a new set of images. For example, indication receiving module 217 detects that the user points photographic lens 105 of the imaging device to an object of interest. In another example, indication receiving module 217 senses that the user presses down push button 145 to a certain extent as an indication to capture a new set of images. In still another example, indication receiving module 217 receives a voice command to prepare the imaging device to take new pictures.

After receiving the indication to capture a new set of images, setting adjustment module 219 adjusts the capture settings of the imaging device based on the predetermined settings specifically adapted for the user. In the event that the imaging system determines that a user prefers a high contrast and enriched colorization for certain shooting modes, setting adjustment module 219 presets the imaging device to apply such capture settings upon user's indication to capture a new set of images.

Finally, image capturing module 211 may capture the new set of images with the preferred capture settings. With the coordination of the various modules described above, the imaging device may better determine and predict the user preferred settings under various shooting modes and conditions. Thus, the new set of images taken with the predetermined settings may have a higher acceptance rate than the previous sets. Consequently, the imaging device with the ability to predict user preferences and adjust the settings automatically, renders a more satisfactory user experience.

In an example of a variation, embodiments of the elements of image capturing system 200 in FIG. 2, as described herein may be further configured to run in parallel. Such parallel execution of these elements would greatly increase the efficiency and speed of image capturing system 200.

III. Methods

Figure 3:
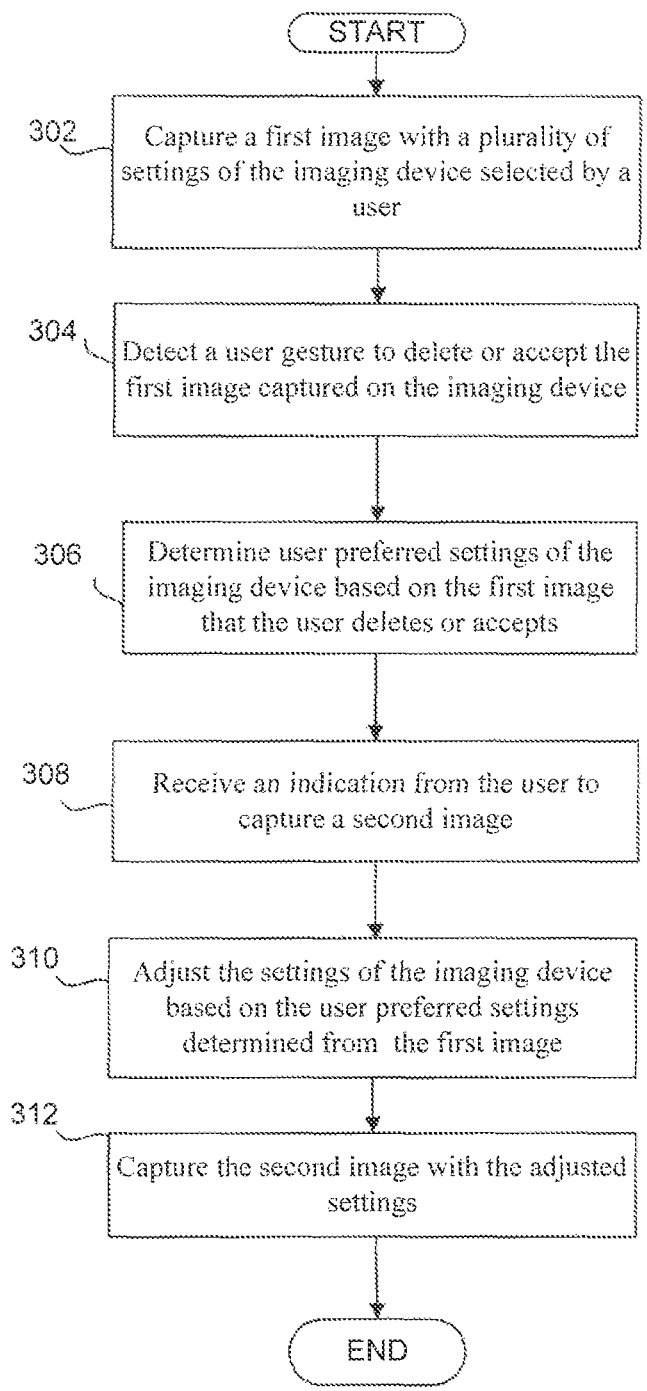
FIG. 3 is a flowchart illustrating one method for dynamically capturing images using prior capture settings and user behaviors, in accordance with an embodiment of the present disclosure.

FIG. 3 is a flowchart illustrating a method for dynamically capturing images using prior capture settings and user behaviors, in accordance with an embodiment of the present invention. For ease of explanation, method 300 will be described with respect to system 200 of FIG. 2, as described above. However, method 300 is not intended to be limited thereto.

At stage 302, a first image or a first set of images is captured on an imaging device. For example, image capturing module 211 captures the first set of images using a plurality of capturing settings of the imaging device. One skilled in the relevant arts will appreciate that the first set of images could be part of a sequence of pictures, or individual still-frame pictures, and the techniques disclosed herein can therefore apply to both motion and still images.

The imaging device may be preset in a configuration mode where the user is presented with a sequence of training images previously taken or stored on the imaging device exploring the user's preferred settings. The user is subsequently asked to make selections to indicate her preferences. In another embodiment, the user is prompted with textual queries exploring the user's preferred settings. In still another embodiment, the presentation of training images and textual queries can be combined to train the imaging device in the configuration mode.

At stage 304, a gesture to delete or accept the first image or the first set of images captured on the imaging device is detected from a user. For example, gesture detecting module 213 detects that the user accepts or deletes one or more pictures from the first set of images in a reviewing mode or in a configuration mode.

At stage 306, the user preferred settings is determined based on the first image or the first set of images that the user accepts or deletes. For example, settings determining module 215 determines the preferred settings based on prior user behaviors. Because each image is taken with a plurality of capture settings, such settings may be preserved in the images accepted by the user as an indication of a user's preferences. Furthermore, the images rejected by the user may indicate capture settings that are considered unsatisfactory to the user. The statistics on the parameters reflecting the capture settings may be collected. In one embodiment, the statistics are stored on the imaging device. Alternatively, the statistics are transmitted via a transmitter/receiver to a remote computing device.

According to an embodiment of the present invention, based on the statistics collected on prior capture settings and user behaviors, a machine learning algorithm is used to recognize patterns in a user's selections/rejections, and to predict user preferred settings. One skilled in the relevant arts will appreciate that any machine learning approaches such as decision tree learning, Bayesian network, and clustering analysis can be utilized to make the predictions.

According to another embodiment of the present invention, several data points collected related to a parameter of the capture setting preserved in the accepted images are averaged out to get a default setting. Conversely, the data points corresponding to parameters contained in the rejected images can be excluded from calculating the default value.

At state 308, an indication to capture a second image or a second set of images is received from the user. Indication receiving module 217 may be used to receive the user's indication to capture the second set of images.

At stage 310, the settings of the imaging device are adjusted based on the user preferred settings determined from the first image or the first set of images. Settings adjusting module 219 may adjust and set the preferred settings of the user according to the calculation and determination performed at stage 308. As an alternative, the user may have the option to overwrite the default setting determined at stage 308 by specifying a preferred value directly.

A user profile may be established describing the parameters corresponding to the preferred settings learned from stage 306. Consequently, the imaging device may load the user profile and adjust the settings based on the parameters stipulated in the user profile.

At stage 312, the second image or the second set of images is captured with the adjusted settings. Upon the completion of the adjustment, image capturing module 211 may capture the second set of images with the user preferred settings.

One skilled in the relevant arts will appreciate that the aforementioned steps could be executed in different combinations and with varying degrees of parallelism. For example, each image may be processed in accordance with the aforementioned stages in parallel with processing other images.

Figure 4:
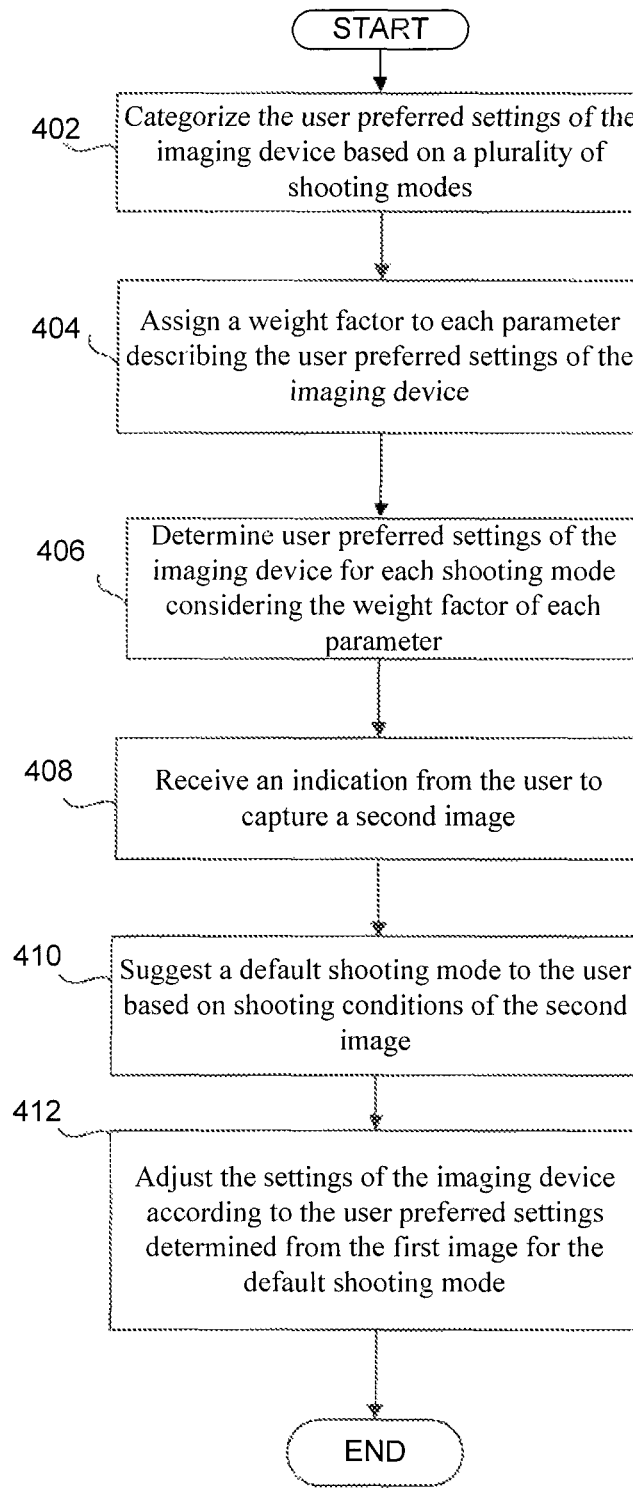
FIG. 4 is a flowchart illustrating another method for dynamically capturing images using prior capture settings and user behaviors, in accordance with another embodiment of the present disclosure.

FIG. 4 is a flowchart illustrating another method to dynamically capture images using prior capture settings and user behaviors, in accordance with another embodiment of the present invention. The followings illustrate an embodiment of the invention, corresponding to stages 306 to 310 of the method described in FIG. 3, in further details.

Based on the images captured previously and the user's prior behaviors, the imaging device may attempt to determine the preferred settings at stage 402. At stage 402, the user preferred settings are initially categorized based on shooting modes. For example, a portrait mode allows the user to focus attention on subjects near the imaging device by blurring distant objects with a narrow aperture to soften the background. A landscape mode captures detailed scenes of distant objects, by increasing the depth of field so objects near and far away remain crisp and in focus. A macro mode is suitable to take close up pictures, such as when shooting flowers, insects or small objects. A night mode captures dramatic colors and details at night and in other low-light situations by using a long exposure. A sports mode or action mode captures sporting events, or any moving scene to avoid blur with a fast shutter speed. A panorama mode captures grand landscapes using groups of pictures to create one wide image by merging several shots into one seamless photo.

In one embodiment of the invention, the imaging device suggests and supplies a shooting mode automatically based on the object in the photographic lens. The imaging device may use its internal clock or built-in GPS to determine the shooting mode of the object in the photographic lens. For example, a night mode is suggested based on information on time of the day obtained from the internal clock. In another example, a landscape or panorama mode may be suggested based on the terrain of the surroundings obtained from the GPS.

According to another embodiment, the shooting mode is selected by the user manually. The parameters representing user preferred settings may be categorized according to the shooting modes to illustrate user preferences under each shooting mode.

At stage 404, a weight factor is assigned to each parameter describing the user preferred setting. For example, a weight factor is assigned to the parameters describing the capture settings according to the duration of the images retained on the imaging device. If the user rejects an image immediately after it is taken, a penalty is assigned to the parameters associated with the image. In contrast, if the user accepts an image and retains that image for a relative longer period of time compared to other images taken of the same object consecutively, a heavier weight may be assigned to the parameters associated with the image retained for a prolonged period of time.

Considering the weight factor associated with each parameter, the preferred settings for a shooting mode are determined at stage 406. A preferred setting may be deduced by taking an average on the parameter factoring its weight. Similar to stage 308 in FIG. 3, an indication is received from the user to capture a second image or a second set of images at stage 408.

At stage 410, the imaging device suggests a default shooting mode to the user based on the shooting conditions of the second set of images. The user may have the option to overwrite the default mode by stipulating a shooting mode of her choice.

At stage 412, for the shooting mode assigned to the second set of images, the imaging device is adjusted to load the preferred settings determined from stage 406 and the images are captured accordingly.

One skilled in the relevant arts will appreciate that stages 402, 404 and 410 are optional and the present disclosure may be practiced without the necessity to categorizing the settings based on shooting modes and assigning weight factors. Furthermore, one skilled in the relevant arts will appreciate that the aforementioned stages described in FIG. 4 could be executed in different combinations and with varying degrees of parallelism.

IV. Example Computer Implementation

Figure 5:
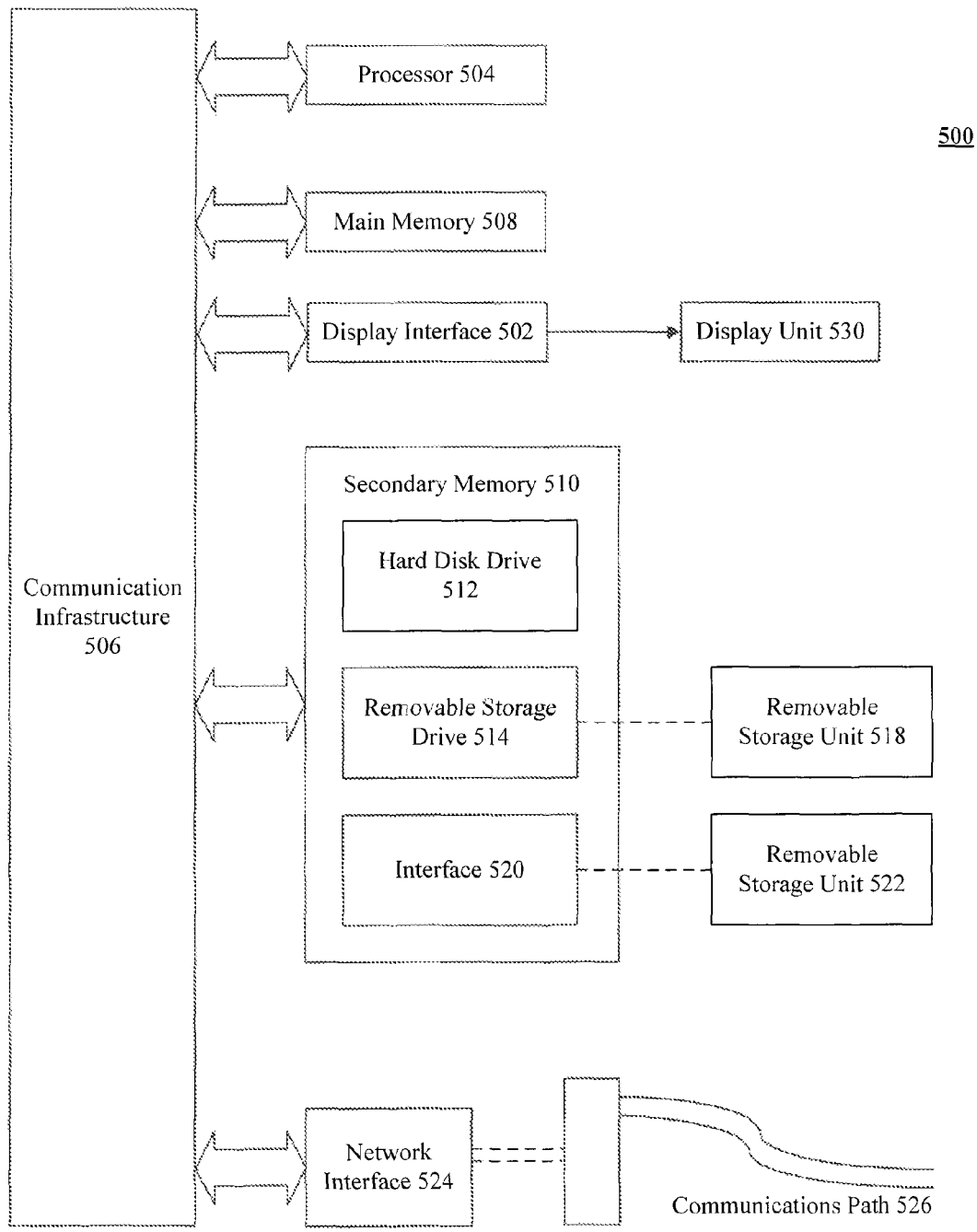
FIG. 5 depicts an example computer system in which embodiments of the present disclosure may be implemented.

Various aspects of the present disclosure can be implemented by software, firmware, hardware, or a combination thereof. FIG. 5 illustrates an example computer system 500 in which the present disclosure, or portions thereof, can be implemented as computer-readable code. For example, system 200 in FIG. 2 and the processes in FIGS. 3 and 4 can be implemented in system 500. Various embodiments of the invention are described in terms of this example computer system 500. After reading this description, it will become apparent to a person skilled in the relevant art how to implement the invention using other computer systems and/or computer architectures.

Computer system 500 includes one or more processors, such as processor 504. Processor 504 can be a special purpose or a general purpose processor. Processor 504 is connected to a communication infrastructure 506 (for example, a bus or network).

Computer system 500 also includes a main memory 508, preferably random access memory (RAM), and may also include a secondary memory 510. Secondary memory 510 may include, for example, a hard disk drive 512, a removable storage drive 514, and/or a memory stick. Removable storage drive 514 may comprise a floppy disk drive, a magnetic tape drive, an optical disk drive, a flash memory, or the like. The removable storage drive 514 reads from and/or writes to a removable storage unit 515 in a well-known manner. Removable storage unit 515 may comprise a floppy disk, magnetic tape, optical disk, etc. that is read by and written to by removable storage drive 514. As will be appreciated by persons skilled in the relevant art(s), removable storage unit 515 includes a computer usable storage medium having stored therein computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units such as removable storage unit 522 and interfaces such as interface 520 that allow software and data to be transferred from the removable storage unit 522 to computer system 500.

Computer system 500 may also include a communications interface 524. Communications interface 524 allows software and data to be transferred between computer system 500 and external devices. Communications interface 524 may include a modem, a network interface (such as an Ethernet card), a communications port, a PCMCIA slot and card, or the like. Software and data transferred via communications interface 524 are in the form of signals that may be electronic, electromagnetic, optical, or other signals capable of being received by communications interface 524. These signals are provided to communications interface 524 via a communications path 526. Communications path 526 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 515, removable storage unit 522, and a hard disk installed in hard disk drive 512. Signals carried over communications path 526 can also embody the logic described herein. Computer program medium and computer usable medium can also refer to memories, such as main memory 508 and secondary memory 510, which can be memory semiconductors (e.g. DRAMs, etc.). These computer program products are means for providing software to computer system 500.

Computer programs (also called computer control logic) are stored in main memory 508 and/or secondary memory 510. Computer programs may also be received via communications interface 524. Such computer programs, when executed, enable computer system 500 to implement the present invention as discussed herein. In particular, the computer programs, when executed, enable processor 504 to implement the processes of the present invention, such as the steps in the methods illustrated by flowcharts 200 of FIGS. 2 and 300 of FIG. 3, discussed above. Accordingly, such computer programs represent controllers of the computer system 500. Where the invention is implemented using software, the software may be stored in a computer program product and loaded into computer system 500 using removable storage drive 514, interface 520, hard drive 512 or communications interface 524.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

V. Conclusion

It is to be appreciated that the Detailed Description section, and not the Summary and. Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. An image capturing system, comprising:
    a memory configured to store modules including:
        a settings capturing module configured to capture a first image on an imaging device, wherein the first image is associated with a setting of the imaging device selected by a user,
        a gesture detecting module configured to detect a user gesture to delete or accept the first image captured on the imaging device,
        a settings determining module configured to determine a user preferred setting of the imaging device, the user preferred setting having a set of parameters based on the first image that the user deletes or accepts, wherein a weight factor associated with a duration of the first image retained by the user is assigned to each of the, parameters,
        an indication receiving module configured to receive an indication from the user to capture a second image, and
        a settings adjusting module configured to adjust the setting of the imaging device based on the user preferred setting determined from the first image,
        the settings capturing module further configured to capture the second image with the adjusted setting; and
    a processor coupled to the memory and configured to process the modules.

2. The system of claim 1, wherein the first image includes a first set of images and the second image includes a second set of images.

3. The system of claim 1, wherein the settings determining module is further configured to establish a user profile describing the user preferred setting of the imaging device.

4. The system of claim 3, wherein the settings adjusting module is further configured to adjust the setting of the imaging device based on user preferences information contained in the user profile.

5. The system of claim 1, wherein the settings determining module is further configured to:
    categorize the user preferred setting of the imaging device based on a shooting mode; and
    determine the user preferred setting of the imaging device for the shooting mode based on the first image,
    wherein the shooting mode corresponds to the set of parameters of the user preferred setting of the imaging device associated with the shooting mode.

6. The system of claim 5, wherein the settings determining module is further configured to:
    determine the user preferred setting of the imaging device for each shooting mode based on the weight factor of each parameter.

7. The system of claim 1, wherein the settings adjusting module is further configured to:
    suggest a default shooting mode based on shooting conditions of the second image; and
    adjust the setting of the imaging device based on the user preferred setting determined from the first image,
    wherein the user preferred setting is associated with the default shooting mode.

8. The system of claim 7, wherein the settings adjusting module is further configured to suggest the default shooting mode to the user based on information obtained from at least one of a Global Positioning Systen (GPS) or an internal clock installed on the imaging device.

9. The system of claim 1, wherein the settings determining module is further configured to determine the user preferred setting of the imaging device based on textual queries provided to the user in a configuration mode.

10. The system of claim 1, wherein the settings determining module is further configured to determine the user preferred setting of the imaging device based on training images provided to the user in a configuration mode.

11. A non-transitory computer-readable storage device having instructions stored thereon, execution of which, by a computing device, causes the computing device to perform operations comprising:
    capturing a first image on an imaging device, wherein the first image is associated with a setting of the imaging device selected by a user;
    detecting a user gesture to delete or accept the first image captured on the imaging device;
    determining user preferred setting of the imaging device, the user preferred setting set of parameters based on the first image that the user deletes or accepts, wherein a weight factor associated with a duration of the first image retained by the user is assigned to each of the parameters;
    receiving an indication from the user to capture a second image;
    adjusting the setting of the imaging device based on the user preferred setting determined from the first image; and
    capturing the second image with the adjusted setting.

12. The non-transitory computer-readable storage device of claim 11, wherein the first image includes a first set of images and the second image includes a second set of images.

13. The non-transitory computer-readable storage device of claim 11, wherein determining the user preferred setting further comprises:
    establishing a user profile describing the user preferred setting of the imaging device.

14. The non-transitory computer-readable storage device of claim 13, wherein adjusting the setting further comprises:

adjusting the setting of the imaging device based on user preferences information contained in the user profile.

15. The non-transitory computer-readable storage device of claim 11, wherein determining the user preferred setting further comprises:
categorizing the user preferred setting of the imaging device based on a shooting mode; and
determining the user preferred setting of the imaging device for the shooting mode based on the first image, wherein the shooting mode corresponds to the set of parameters of the user preferred setting of the imaging device associated with the shooting mode.

16. The computer-readable storage device of claim 15, wherein determining the user preferred setting further comprises:
determining the user preferred setting of the imaging device for the shooting mode based on the weight factor of each parameter.

17. The non-transitory computer-readable storage device of claim 11, wherein adjusting the setting further comprises:
suggesting a default shooting mode based on shooting conditions of the second image; and
adjusting the setting of the imaging device based on the user preferred setting determined from the first image, wherein the user preferred setting is associated with the default shooting mode.

18. The non-transitory computer-readable storage device of claim 17, wherein suggesting a default shooting mode further comprises:
suggesting a default shooting mode based on information obtained from at least one of a Global Positioning System (GPS) or an internal clock installed on the imaging device.

19. A method for dynamically capturing images, comprising:
capturing a first image on an imaging device, wherein the first image is associated with a setting of the imaging device selected by a user;
detecting a user gesture to delete or accept the first image captured on the imaging device;
determining a user preferred setting of the imaging device, the user preferred setting having a set of parameters based on the first image that the user deletes or accepts, wherein a weight factor associated with a duration of the first image retained by the user is assigned to each of the parameters;
receiving an indication from the user to capture a second image;
adjusting the setting of the imaging device based on the user preferred setting determined from the first image; and
capturing the second image with the adjusted setting.

20. The method of claim 19, wherein determining the user preferred setting further comprises:
categorizing the user preferred setting of the imaging device based on a shooting mode; and
determining the user preferred setting of the imaging device for the shooting mode based on the first image, wherein the shooting mode corresponds to the set of parameters of the user preferred setting of the imaging device associated with the shooting mode.

* * * * *

UNITED STATES PATENT AND TRADEMARK OFFICE
CERTIFICATE OF CORRECTION

| | |
|---|---|
| PATENT NO. | : 8,913,150 B2 |
| APPLICATION NO. | : 13/401017 |
| DATED | : December 16, 2014 |
| INVENTOR(S) | : Ilia Vitsnudel |

It is certified that error appears in the above-identified patent and that said Letters Patent is hereby corrected as shown below:

In the Claims

Column 9, line 46, please replace "the," with --the--.

Column 10, line 46, please replace "determining user" with --determining a user--.

Column 10, line 47, please replace "setting set" with --setting having a set--.

Signed and Sealed this
Fifth Day of May, 2015

Michelle K. Lee
*Director of the United States Patent and Trademark Office*